United States Patent [19]

Haubner et al.

[11] 3,919,987

[45] Nov. 18, 1975

[54] METHOD AND APPARATUS FOR AUTOMATIC SHIFT OF IGNITION TIMING

[75] Inventors: Georg Haubner, Berg; Jurgen Wesemeyer, Nurnberg-Reichelsdorf; Werner Meier, Schwabach, all of Germany

[73] Assignee: Robert Bosch GmbH, Stuttgart, Germany

[22] Filed: Sept. 13, 1974

[21] Appl. No.: 505,800

[30] Foreign Application Priority Data

Sept. 23, 1973 Germany............................. 2352941

[52] U.S. Cl......................... 123/117 R; 123/117 D
[51] Int. Cl.²........................................... F02P 5/04
[58] Field of Search...... 123/117 R, 148 MC, 117 D

[56] References Cited

UNITED STATES PATENTS

| | | | |
|---|---|---|---|
| 3,454,871 | 7/1969 | Nolting ............................ | 123/117 R |
| 3,738,339 | 6/1973 | Huntzinger et al. ............. | 123/117 R |
| 3,749,073 | 7/1973 | Asplund........................... | 123/117 R |
| 3,752,139 | 8/1973 | Asplund........................... | 123/117 R |
| 3,757,755 | 9/1973 | Carner............................. | 123/117 R |
| 3,795,235 | 3/1974 | Donohue et al. ............. | 123/148 MC |

Primary Examiner—Charles J. Myhre
Assistant Examiner—Joseph Cangelosi
Attorney, Agent, or Firm—William R. Woodward; Flynn & Frishauf

[57] ABSTRACT

A transducer provides a signal in the form of a pulse of steady current on which an alternating current is superimposed over a period corresponding to the range of ignition timing shift. Beginning at the same time, a timing circuit determines the width of a gate in which pulses from a pulse generator will be transmitted. The gate width and the pulse generator frequency are controlled by operating conditions of the engine, such as temperature and intake vacuum. The alternations of the transducer output signal are counted in a first counter and the pulses passed through the gate are counted in a second counter and stored for the next count interval. That stored count and the count of the first counter are compared and a match in these inputs controls a trigger for the ignition circuit. At high speeds, the stored count is zero and a null detector allows the initial part of the transducer signal to trigger the ignition, this being the maximum spark advance. Such circuits allow the timing shift to begin at a moderate threshold speed and to vary rapidly with speed over a relatively narrow speed range, until the maximum timing shift is reached. This critical speed range is shifted by changes of engine temperature or of intake vacuum.

17 Claims, 7 Drawing Figures

Fig. 2
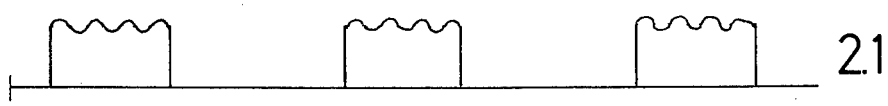 2.1
 2.2
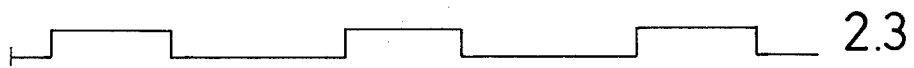 2.3
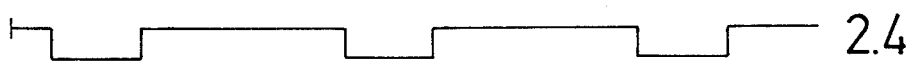 2.4
 2.5
 2.6
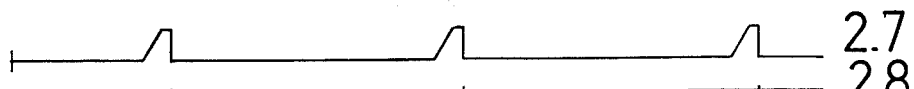 2.7
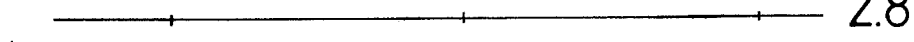 2.8
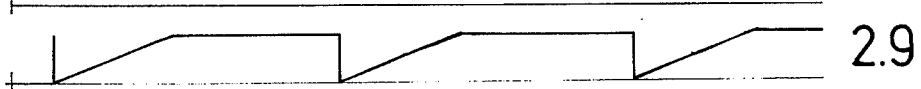 2.9
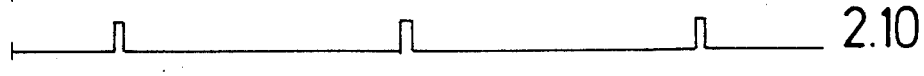 2.10

Fig. 6
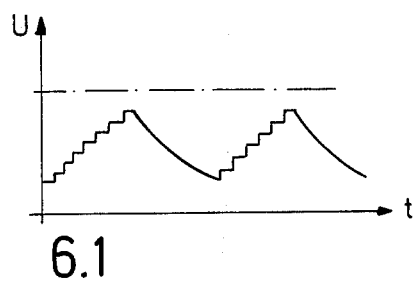
6.1
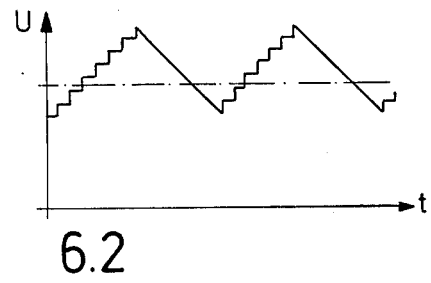
6.2
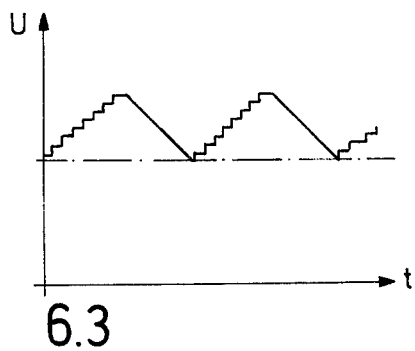
6.3
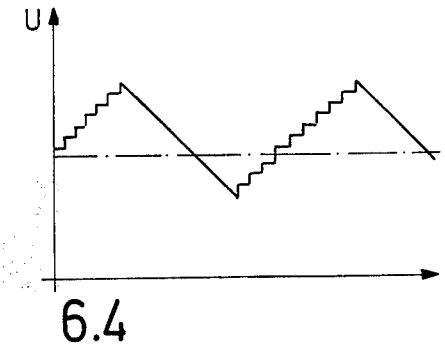
6.4

METHOD AND APPARATUS FOR AUTOMATIC SHIFT OF IGNITION TIMING

This invention relates to a method and apparatus for timing electrical pulses utilized by a rotary machine, such as ignition pulses of an internal combustion engine, over a range of timing adjustments in accordance with operating conditions of the machine, and particularly with timing with reference to the beginning point of a sequence of electrically detectable marks carried by a count-off disk coupled with a drive shaft of the engine.

If an internal combustion engine is driven at a speed that varies, equipment should be provided for advancing and retarding the ignition timing. The timing adjustment is usually expressed in terms of the angle of rotation of the crankshaft between the moment of ignition in a particular cylinder and the upper deadpoint, or point of reversal of movement, of the piston in the cylinder. The offset angle plotted against the engine speed provides the spark timing curve of the engine.

The ignition timing angle has an important influence on the combustion of the fuel-air mixture at the beginning of the working stroke and affects both the power developed by the engine and the composition of its exhaust gas emission. As the result of the increasingly strict requirements regarding exhaust gas emission, the adjustment of the ignition timing for each operating condition of the engine has acquired a special importance. The mechanical timing adjustment systems in general use up to now do not permit a satisfactory adjustment with respect to the effect on exhaust gas composition.

The ignition timing angle can be determined and calculated with substantially greater accuracy by electronic methods. Furthermore, an electronic circuit enables the timing of the ignition of the engine to take account of various influences under operating conditions, as for example the temperature, the momentary loading of the engine and the engine speed.

A method and apparatus for generating ignition pulses is known in which means for causing generation of a train of pulses in a transducer are provided on a disk coupled to the crankshaft of the engine. These features provided on the disk, which may be regarded as electrically detectable marks, occupy only a part of the circumference of the disk. The sequence of pulses excited in the transducer is then electronically subdivided into a reference sequence and a spark generating sequence. During the reference sequence, a definite number of pulses are counted into a counter during a predetermined fixed time interval.

The result of the count at the end of the reference sequence of pulses accordingly depends upon the speed of the disk and is therefore a direct measure for the engine speed. At the beginning of the sequence of ignition timing pulses, all of the pulses are supplied to the counter and an ignition pulse is supplied to the engine when the counter reaches a count level that can be freely chosen. In order to obtain a non-linear timing shift characteristic, a spacing that is not constant can be provided for the electrically detectable marks on their carrier disk, which generate the pulses of the ignition timing sequence.

The simpler the method and apparatus for generating ignition timing pulses of the above-described pulse is, the more difficult it is to produce with it steeply rising or falling ignition timing characteristics within a narrow speed range. The pulse exciting devices on the disk must be arranged with great asymmetry and at least some of them must be crowded closely together. Even if this problem could be overcome in its mechanical aspects regarding the constitution of the disk, very exacting requirements are in any event imposed on the transducer by which these devices generate pulses. In consequence, the costs of the system are significantly increased whenever a steep or highly non-linear timing characteristic is required.

It is an object of the present invention to provide a method and apparatus for control of the ignition timing of an engine, or the like, which enables operation with very steep timing shift characteristics.

SUBJECT MATTER OF THE PRESENT INVENTION

Briefly, the pattern of revolving electrically detectable marks is made to produce, in a transducer, a direct current signal with a superimposed alternating current and during the time this signal is produced, a pulse sequence of a character determined by operating parameters of the engine is counted and stored. In the next period in which the transducer produces a direct current signal with superimposed alternating current, the count value thus stored is compared with the operation of a counter that counts the halfwaves of a single polarity of the aforesaid superimposed alternating current and a comparator output pulse is provided when the compared count values are equal. This comparator output pulse controls the immediate generation of an ignition pulse for the engine.

The principle advantage of the invention is that the pulse sequence dependent upon engine parameters, such as the speed, the temperature, the intake vacuum, etc., can be varied over a wide range so as to provide any desired ignition timing characteristic.

The invention is further described by way of example with reference to the accompanying drawings, in which:

FIG. 2 is a timing diagram relating to the operation of the circuit of FIG. 1;

FIG. 6 is a graphical representation of the counting operations in the circuit of FIG. 5.

Figure 1:
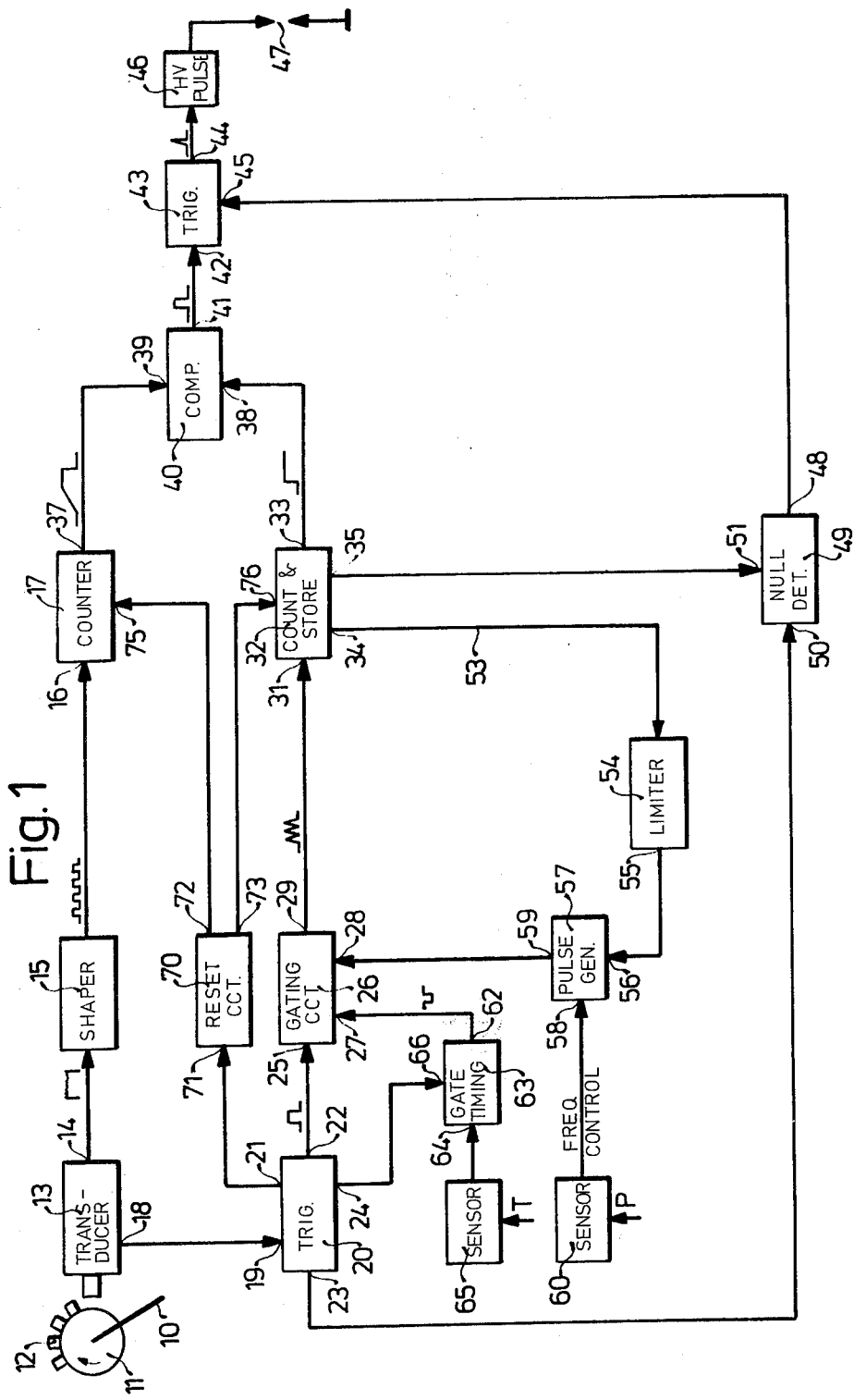
FIG. 1 is a circuit diagram of a circuit for determining the ignition timing angle on a purely digital basis.

FIG. 1 shows pulse train producing features 12 in the form of projecting teeth on the periphery of a disk 11 coupled in fixed relation to a crankshaft 10 of an engine otherwise not shown. The teeth 12 are grouped over a portion of the circumference of the disk 11 and excite pulses as they pass by a transducer 13. A first output 14 of the transducer 13 is connected to a pulse shaper circuit 15 which furnishes the processed transducer signal to the count advancing input 16 of a counter 17. A second output 18 of the transducer 13 is connected to the input 19 of a pulse trigger stage 20 which has trigger outputs 21, 22 23 and 24. The trigger output 22 supplies pulses to an input 25 of a gating circuit 25 that also has other inputs 27 and 28 and an output 29 that is connected to the counting input of a count and store circuit 32. The output 33 of the count and store circuit 32 is connected to one input 38 of the comparator 40 that has a second input 39 to which the output 37 of the counter 17 is connected. Although the wave form symbols associated with these last-mentioned two connections in FIG. 1 indicate comparison of the stored count of the circuit 32 with the progress of the count of counter 37 on an analog basis, it will be understood that a digital comparison is also comprehended by the diagram.

The output 41 of the comparator 40 is connected to the input 42 of the trigger stage 43 that furnishes a trigger through its output 44 to an ignition circuit 46 that produces the usual high voltage pulse for igniting a sparkplug 47, only one sparkplug being shown in FIG. 1 for simplicity of illustration. The trigger stage 43 has a second input 45 connected to the output 48 of a null detector circuit 49 connected through its input 51 to detect a null at the output 35 of the count and store circuit 32. The null detector 49 is also supplied at its input 50 with a trigger from the output 53 of the trigger circuit 20.

The count and store circuit 32 has a third output 44 connected to a limiter circuit 54, the output 55 of which is fed back to an input 56 of the pulse generator 57.

The pulse generator 57 has a frequency control input 58 connected to the output of a control device responsive, for example, to the engine intake vacuum, which device may be referred to as a sensor. The output 59 of the pulse generator 57 is connected to the input 28 of the gating circuit 26. Another input 27 of the gating circuit 26 is connected to the output 62 of a gate length timing circuit 63 that has an input 64 connected with a second sensor 65 which, for example, is responsive to engine temperature. The gate period timing circuit 63 is also provided, at its input 66, with a trigger from the output 24 of the trigger circuit 20.

A resetting circuit 70 is provided, at its input 71, with a trigger from the output 21 of the trigger circuit 20 and has two outputs 72 and 73 from which reset signals are provided respectively to reset the counter 17 through its reset input 75 and to reset the counter and load the store of the count and store circuit 32 through the input 76 thereof.

OPERATION OF FIG. 1 EXPLAINED BY REFERENCE TO FIG 2.

FIG. 2 is a timing diagram on which are plotted 10 wave forms or voltages designated at the right as 2.1, 2.2 . . . 2.10, all to the same time scale. Line 2.1 shows the output signal of the transducer 13. As the disk 11 is turned by the crankshaft 10 in the direction shown by the arrow in FIG. 1, carrying the teeth 12 past the transducer 13, a pulse of the form of the three pulses shown in line 2.1 of FIG. 2 is produced every time the teeth 12 pass by the transducer 13. The pulse shaper circuit 15 strips off and squares the positive shaper circuit 15 strips off and squares the positive halfwaves of the alternating current component of the transducer output, as shown by the representation of the shaper output in line 2.2 of FIG. 2. The direct current component of the transducer output 13 is detected in the trigger stage 20 and reproduced at its output 22 in the form shown in line 2.3 of FIG. 2. Both the length (time span) of the individual pulse trains, each consisting of a fixed number of pulses shown in line 2.2, and the duration of the output pulses at the output 22 of the trigger circuit 20, shown in line 2.3, vary with the speed of the engine. In contrast to this speed variation, the pulse form show in line 2.4, with a pulse length independent of the engine speed is generated by the gating signal circuit 63 at its output 62 and supplied to the input 27 of the gating circuit 26. The gating pulses shown in line 2.4 of FIG. 2. are negative-going pulses beginning in synchronism with the beginning of the transducer signals shown in line 2.1 and, similarly, the d.c. component thereof shown in line 2.3.

The signals shown in line 2.3 are those shown in line 2.4 of FIG. 2 are added in the gating circuit 26 to form the gate signal shown on line 2.5 of FIG. 2, during the gate period of which a sequence of pulses produced by the pulse generator 57 is furnished to the counting input 31 of the count and store circuit 32. The signal at this input 31 is shown on line 2.6 of FIG. 2. At the end of every pulse of the sequence shown on line 2.3, the resetting circuit 70 provides a signal to the count and store circuit 32 that causes the count result formed in that circuit to be stored for the next cycle in the storage portion of the count and store circuit and causes the counter portion of the count and store circuit to be reset to zero, as soon as the store has been loaded. Any previous content in the store is overridden and replaced by the newly stored number. When successive pulse trains arriving at the input 31 of the count and store circuit 32 all have the same number of pulses, the number stored in the count and store circuit 32 remains constant since the same nunber will repeatedly be written in.

The number stored in the count and store circuit 32 is always the highest count produced during the previous period by the summing of the pulses arriving at the input 31. This is indicated in lines 2.7 and 2.8 of FIG. 2, the former representing the summing of the pulses of the counter followed by resetting and the second representing the value stored in the storage section of the count and store circuit, as it appears at the output 33.

The content of the storage section of the count and store circuit 32 is continuously furnished to the input 38 of the comparator 40, which receives at its input 39 the content, as it progresses, of the counter 17 supplied at the output 37 of the latter. When equality is found between the signals at the inputs 38 and 39 of the comparator 40, a pulse is produced at the output 41 of the comparator and communicated to the input 42 of the trigger stage 43 to furnish a trigger pulse at its output 44 for the ignition pulse circuit 46 to produce a spark in the sparkplug 47.

Both the pulse length of the output signal of the gate timing circuit 63 (line 2.4 of FIG. 2) and the frequency of the pulse generator 57 are subject to variation, respectively by the sensors 65 and 60. In FIG. 1 the sensor 65 is shown as responding to engine temperature, while the sensor 60 responds to the underpressure of the engine intake.

In the illustration of FIG. 2, the pulse shown on line 2.4 have a shorter duration than those on line 2.3. The width of the pulses of line 2.3 is reduced with increasing speed of revolution of the pulse disk 11, so that the width of the pulses of line 2.4 can be so controlled that only at the maximum speed of the engine will the pulses of line 2.3 be shortened enough to match them. In such a case, no pulses from the pulse generator 57 can pass through the gating circuit 26 and reach the counting input 31 of the count and store circuit 32, in consequence of which the content of the store will become and remain zero. Since even under that condition of operation a spark must be produced, a null recognition circuit 49 operates to pass a pulse from the transducer 13 arriving through the trigger circuit 20 and its output 23 directly through the activated null detector 49 to the input 45 of the trigger circuit 43. In this operation, the maximum ignition advance angle is obtained with reference to the upper deadpoint of the cylinder in question.

As the engine speed is reduced from the maximum speed, the duration of the pulses of line 2.3 increases, the gate period illustrated on line 2.5 increases, as does also the number stored in the store of the count and store circuit 32. Accordingly, an increasing number of the pulses (line 2.2) of the a.c. component of the signal of the transducer 13 becomes necessary to produce an output in the comparator 40 and the equality of level of the signals of lines 2.8 and 2.9, at the respective comparator inputs, occurs at a later time. This results in a delayed pulse (line 2.1) and consequently a smaller ignition angle for the resulting spark.

The maximum content in the counter 17 is fixed by the number of pulse-exciting teeth 12 on the pulse-exciting disk 11. The maximum stored content of the count and store circuit 32, on the other hand, is determined by the duration of the gate signal illustrated on line 2.5, i.e. by the number of pulses of the pulse generator 57 which are passed during that time period to the counting input 31 of the count and store circuit 32. The limiter stage 54 limits the maximum content of the count and store circuit 32 to the total number of pulses that can be furnished to the counter 17. At output signal of the limiter stage 54, accordingly, stops the delivery of pulses by the pulse generator 57 as soon as the count value in the counting portion of the count and store circuit 32 has reached this maximum value.

Although lines 2.7, 2.8 and 2.9 show the progress of the counting and the storage of the count value in analog form, it will be understood that the counter outputs and the counter store may also be provided on a binary digital basis and that the comparison may be made between binary digit signals rather than between analog voltage levels. Counter circuit are known both with analog and digital outputs and at least the former may be regarded as the equivalent of integrators.

Figure 3:
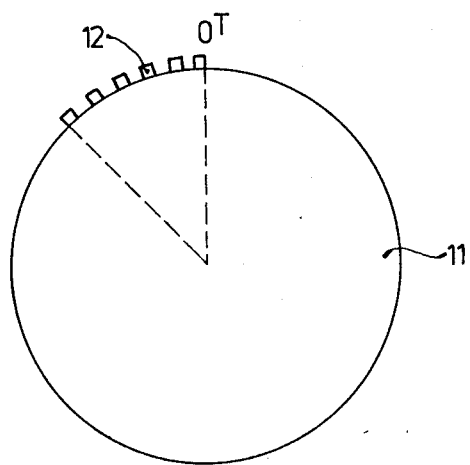
FIG. 3 is a diagrammatic view in the axial direction of a timing control disk with an array of features for generating a sequence of pulses in a transducer.

FIG. 3 is a schematic view in the axial direction of a pulsing disk 11 for a two-cylinder internal combustion engine. The disk 11 is in this case provided with a single segment carrying pulse exciting teeth 12 on the circumference of the segment, corresponding to the spark advance-retard range of the engine. In an engine with more cylinders, the pulsing disk must have correspondingly more segments with these pulse exciting devices.

Figure 4:
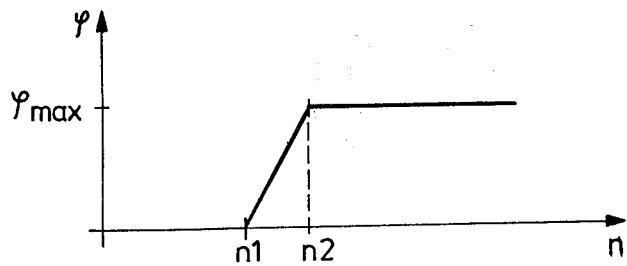
FIG. 4 is a graphical representation of a timing characteristic having a steep rise.

FIG. 4 is a graph illustrating a spark timing characteristic for which the circuits here described are particularly well suited. At speeds up to the beginning of the timing shift at the speed n1, the signal of line 2.3 of FIG. 2 is considerably longer than the signal of line 2.4. That means that the gate duration is very large and the maximum pulse count is repeatedly supplied to the counting input 31 of the count and store circuit 32. With speed increasing above the value n1, the duration of the pulses of line 2.3 and, consequently, that of the gate periods shown on line 2.5 is progressively reduced, so that the count of pulses in the count and store circuit 32 is likewise reduced. In consequence, in proportion to the speed n of the engine, the output pulses (line 2.10) of the comparator 40 shift the control of the ignition circuit 46 in the direction of spark advance and this proceeds with increasing speed until at the speed n2 a null pulse count is reached in the count and store circuit 32 and hence the maximum spark advance. Within the range over which the spark can be advanced, digital timing shift is fully effective, whereas the null detector 49 provides the maximum advance timing, at which the rising edge of the output pulse of transducer 13 is transmitted directly to the ignition trigger stage 43.

Figure 5:
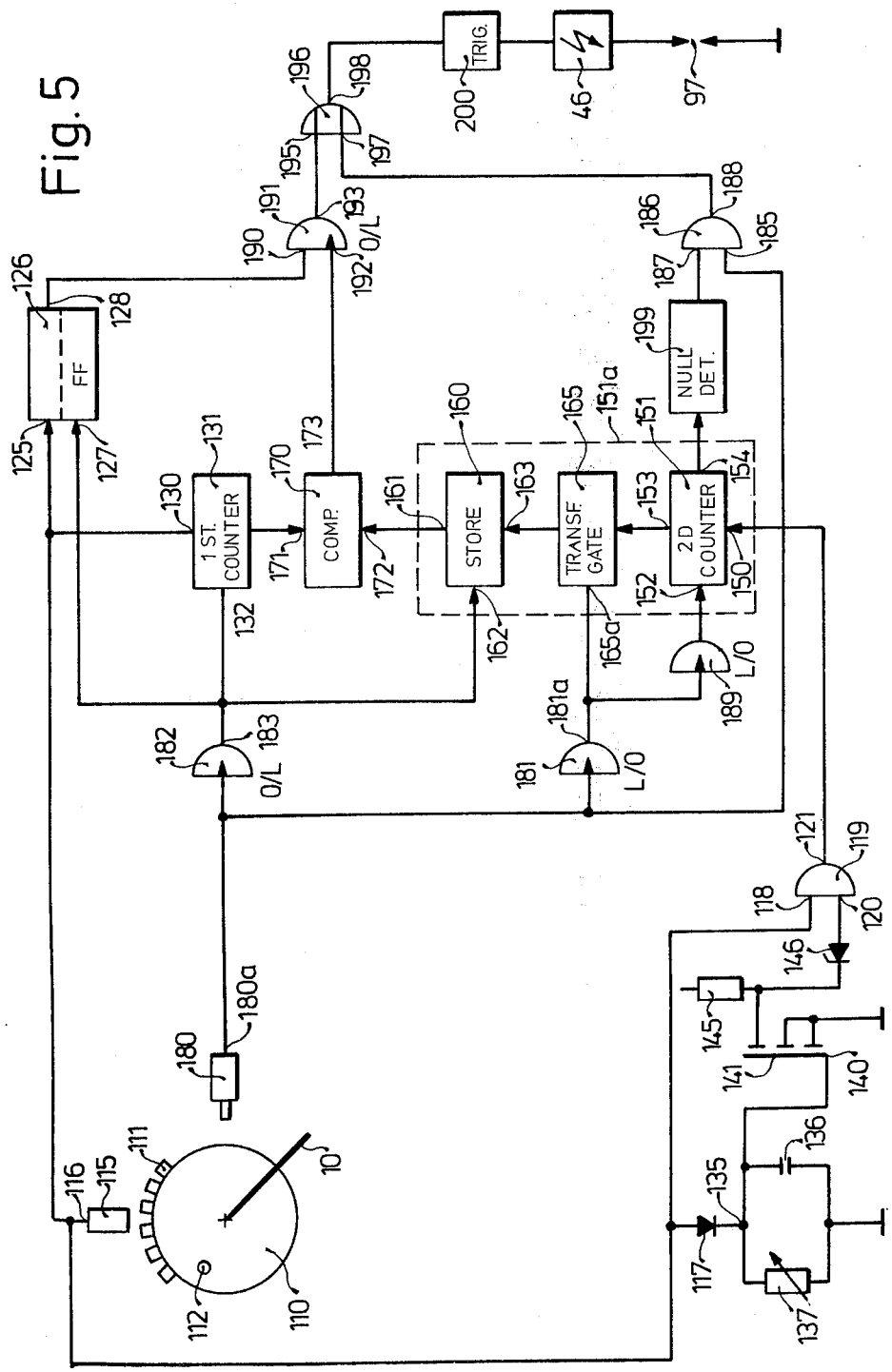
FIG. 5 is a circuit diagram of a circuit for determining the ignition timing angle on a mixed analog and digital basis.

A second illustrative example embodying the invention is shown in FIG. 5. This circuit, in contrast to that of FIG. 1, has both a digital and an analog processing of pulses. Moreover, this circuit requires additional information from the pulsing disk 110 for resetting the counter.

The pulsing disk 110, again fixedly coupled to the crankshaft 10, has pulse exciting means in two different planes for exciting two different transducers. For simplicity of illustration, the first pulse exciting means are shown as the provision of teeth 111 on the circumference of a sector of the disk and the additional pulse exciting means are shown as a hole 112 bored through the disk 110. The first pulse exciting means 111, again arranged over the timing shift range of the engine, is capable of exciting a transduce 115, the output of which is connected with the anode of a diode 117, with one input 118 of an AND-gate 119, with the set input 125 of a flipflop circuit 126, and with the counting input 120 of a first counter 131. The cathode of the diode 117 is connected to a junction point 135 between which and ground a capacitor 136 and a variable resistor 137 are connected in parallel. The gate electrode 140 of a field effect transistor 141 is also connected to the junction point 135. The source terminal of the field effect transistor is directly connected to ground, whereas the drain terminal of the transistor is connected over a load resistor to the positive terminal of a voltage source not shown in the diagram. Also connected to the drain terminal of the field effect transistor is a Zener diode 146 connected with its cathode on the drain side and its anode connected to a second input 120 of the AND-gate 119. The output 121 of this AND-gate 119 is connected to the counting input 150 of a second counter 151, which also has a reset input 152 and two outputs 153 and 154. A storage circuit 160 has its input 163 connected through a transfer gate 165 with the output 153 of the second counter 151. A comparison stage 170 has its inputs 171 and 172 respectively connected to the outputs of the first counter 131 and the store 160. The second counter 151 is combined with the transfer gate 165 and the store 160 in the same manner as the count and store circuit 32 of FIG. 1 was constituted and this combination is shown by the dashed lines in FIG. 5, so that it may be designated as the count and store circuit 151a. A second transducer 180 arranged to be responsive to the pulse exciting feature 112 (the hole in the disk 110) has its output 180a connected to the respective inputs of two dynamic gates 181 and 182 and also to one input 185 of an AND-gate 186.

A dynamic gate, as the term is here used, means a circuit that has the property to respond to the transmit only the edges of pulses, and in the designation of a dynamic gate it is always specified which pulse edge (the positive- or negative-going edge) will be permitted to pass through the gate. Thus, in the case of the gate 182, it is specified that the transition from a O-signal to an L-signal, which is to say the leading edge in case the rest condition of the circuit is a O-signal, will be transmitted. The converse transition is designated as being past by the gates 181 and 189, for example. The second counter 151 has a reset input 152 connected to the output of a dynamic gate 189, of which the input is provided by the output 181*a* of the dynamic gate 181. The transfer gate 165 also has a reset input 165a which, however, is directly connected to the output of the dynamic gate 181*a*. The first counter 131 has its reset input 132 connected to the output 183 of the dynamic gate 182, which output is also furnished to the reset input 127 of the flipflop 126 and also to the reset input 162 which is provided for the store 160. The flipflop circuit 126 has a noninverting output 128 connected to a static input 190 of a dynamic AND-gate 191. The latter has a dynamic input 192 connected with the output 173 of the comparator 170 and has an output 193 connected to one input 195 of an OR-gate 196. The second input 197 of this OR-gate 196 is connected to the output 188 of the AND-gate 186. The output 198 of the OR-gate 196 is supplied to a trigger stage 200, which supplies trigger pulses to an ignition pulse circuit 46 operating into a sparkplug 47. Finally, a null detector 199 is supplied with the content of the second counter 151 through the output 154 of that counter and provides an output to the input 187 of the AND-gate 186.

OPERATION OF THE CIRCUIT OF FIG. 5.

It is first assumed that the pulse exciting device 112 on the pulsing disk 110 has just produced a pulse in the second transducer 180. Such a pulse causes the flipflop circuit 126 to be reset, so that no further signal persists at its noninverting output 128 and causes the first counter 131 to be reset and the content of the store 160 to be annulled. Immediately thereafter, the same pulse from the transducer 180 causes the content of the second counter 151 to be transferred to the store 160 by the transfer gate 165, followed by resetting of the second counter 151 through the dynamic gate 189. The subsequent counting pulses produced by the first transducer 115, excited by the disk features 111, are supplied to the set input 125 of the flipflop circuit 126 and produce a positive signal at the noninverting output 128. These counting pulses are also supplied to the input 130 of the first counter 131, also to the diode 117 and through it to the resistor-capacitor network 137, 136 and, also, to the input 118 of the AND-gate 119. The faster the counting pulses are supplied to the resistor-capacitor network, the higher the level to which the capacitor 136 is charged. Beginning with a certain level of the voltage across the capacitor 136, the field effect transistor 141 becomes conducting and produces a O-signal at the input 120 of the AND-gate 119. Thus, only the beginning pulses of the transducer 115 are transmitted to the output 121 of the AND-gate 119 and to the second counter 151. This second counter 151 counts the pulses and transmits the final count to the store 160 as soon as the next pulse from the second transducer 180 arrives. As mentioned before, the output 161 of the store 160 is connected to the input 172 of the comparator 170. The next sequence of pulses from the first transducer 115 is counted by the first counter 131 from zero up to the maximum which is set by the number of pulse exciting devices 111. Since this maximum number is greater than or equal to the content of the store 160, every pulse train from the first counter 115 will produce a signal in the comparator 170 which will be supplied to the dynamic input 192 of the dynamic AND-gate 191. At the static input 190 of this dynamic AND-gate 191, however, a positive signal is present during the pulse train from the first transducer 115 and then on until a signal arrives from the second transducer 180. The output pulse of the dynamic AND-gate 191 is, finally, supplied through the OR-gate 196 to the trigger stage 200, which causes the ignition circuit 46 to produce a spark in the sparkplug 47.

In the case of a very large time constant of the RC combination of the variable resistor 137 and the capacitor 136, no pulses of the first transducer 115 are transmitted to the output 121 of the AND-gate 119. The content of the second counter 151 then remains at zero, but then a null detector 199, interposed between an output 154 of the second counter 151 and an input 187 of the AND-gate 186, provides an output signal, so that when a signal then arrives from the second transducer 180, a signal will proceed from the output 188 of the AND-gate 186, through the OR-gate 196 to the trigger stage 200.

FIG. 6 further illustrates the circuit behavior of the field effect transistor 141. In the four diagrams 6.1, 6.2, 6.3 and 6.4 of FIG. 6, the switching threshold of the field effect transistor 141 is shown by a dot-dash line. The solid curve in each case shows the course of the voltage across the capacitor 136. The diagram 6.1 of FIG. 6 shows the course of the voltage on the capacitor 136 at a low engine speed. The switching threshold of the field effect transistor 141 is not reached in this case. At a higher speed the capacitor 136 does not have enough time to discharge to as a low a level as at low speed, so that the voltage level of the capacitor is raised as shown in the diagram 6.2 of FIG. 6. The voltage so provided on the gate electrode 140 of the field effect transistor 141 then provides switching of the field effect transistor back and forth from time to time, so that all of the pulses from the transducer 115 no longer reach the second counter 151. The comparison stage 170 is then caused to provide a signal at an earlier moment, thus increasing the ignition timing angle.

The diagrams 6.3 and 6.4 of FIG. 6 show effect of the change of the adjustment of the resistor 137 as it affects the behavior of the field effect transistor 141. In the diagram 6.3 of FIG. 6, no pulses at all of the transducer 115 are switched through to the second counter 151. In the case of a small value of the resistor 137, the field transistor 141 can be blocked for a time even at high engine speeds and, thus, also provides a shift of the ignition timing angle. By means of the variable resistor 137, it is accordingly possible to adjust the ignition timing angle for any desired speed of the crankshaft 10. The resistor 137 can, accordingly, be adjusted in dependence on one or more of various operating parameters of the engine, as for example engine temperature and/or pressure.

Figure 7:
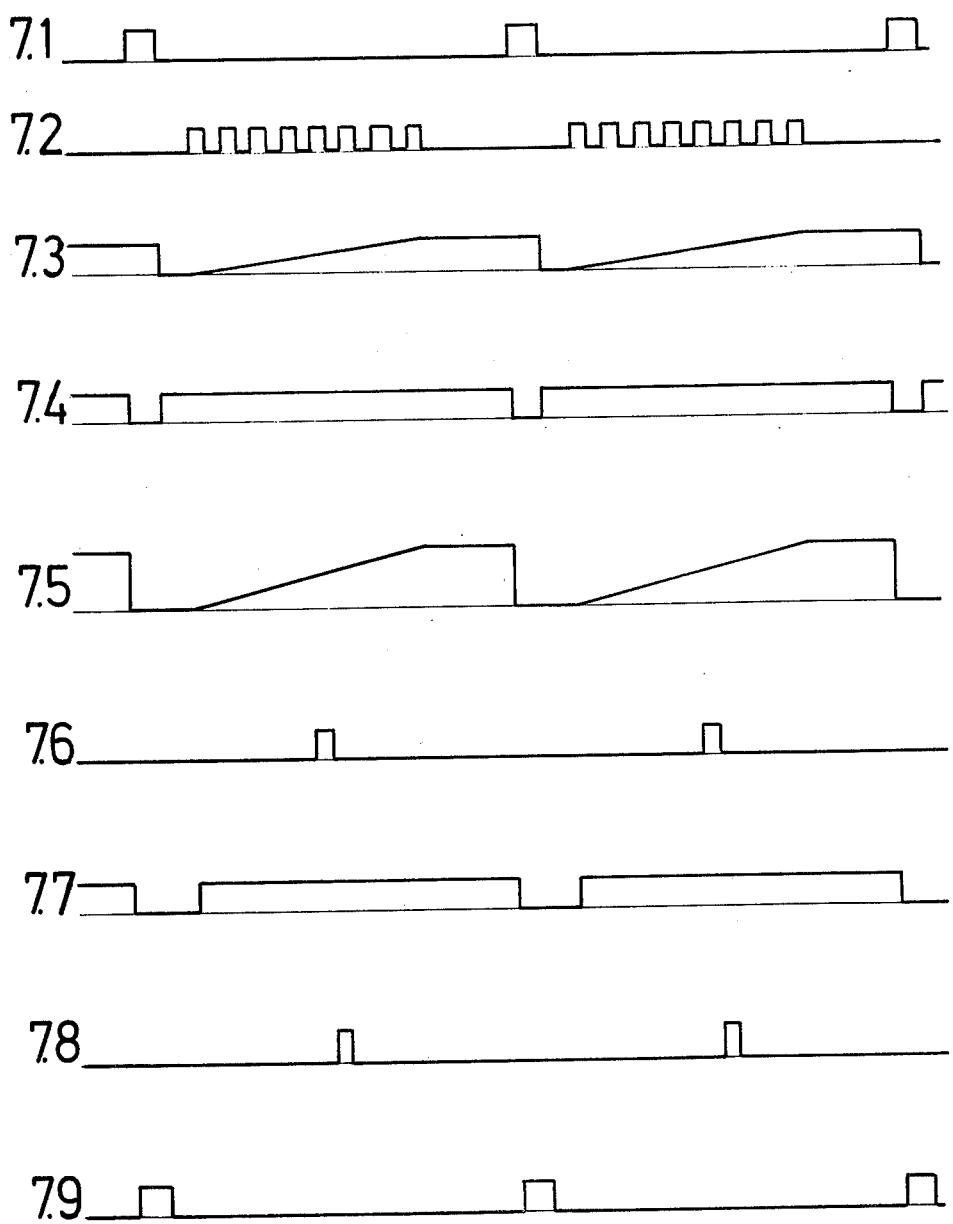
FIG. 7 is a timing diagram of the operation of the circuit of FIG. 5.

FIG. 7 is a timing diagram showing the relation of the various signals in the circuit of FIG. 7 on the lines 7.1, 7.2, . . . 7.9, all of which are drawn to the same time scale. The pulses of the second transducer 180 are shown on line 7.1. Line 7.2 shows one possible configuration of signal from the second counter 151 and line 7.3 shows the progress of the content of the second counter 151. Line 7.4 shows the resulting content of the store 160. The content of the first counter 131 is shown on line 7.5 and the output signal of the comparator 170 that is produced upon parity of the content of the first counter and the content of the store 160 is shown on line 7.6. The voltage of the output 128 of the flipflop circuit 126 appears on line 7.7 and the output signal of the OR-gate 196 on line 7.8. Line 7.9 show, for comparison, the output of the AND-gate 186 for the case of maximum ignition timing angle.

The two circuits illustrated and described provide the capability above indicated as desirable for a very large variation of the ignition timing angle over a narrow range of speeds. This is particularly the outstanding advantage of these circuits compared to the known systems for ignition timing shift. These circuits, moreover, provide a very large margin of safety against backwards operation of the engine and permit the range of speeds over which the change of ignition timing is provided to be exactly defined. A wide variety of constructions can be used for the transducers 13 and 115 in connection with the pulse-exciting features 12 and 111, respectively, so long as they can excite signals of the form of a steady voltage with a superimposed alternating voltage. Both electromagnetic transducers and photoelectric transducers can provide such signals.

The individual stages of the circuits above described are either commercially available or simple to produce. For example, a monostable multivibrator can be used for the gate timing circuit 63 and an astable multivibrator can be used for the pulse generator 57.

It is advantageous in the circuit of FIG. 5 to utilize a transducer with only a small d.c. voltage component in its output signal, in order to improve the facility of counting the individual halfwaves of the alternating component of the signal.

It should further be remarked that the pulsing disk 10, 110, instead of being coupled directly to the crankshaft 10, may be coupled to other engine shafts, such as the cam shaft. It is also possible, especially in magneto ignition systems, to provide, instead of the pulsing disk 10 or 110, the provision of pulse exciting features on the pole wheel of a magneto generator. The pulse exciting devices are in that case likewise to be affixed in locations corresponding to the timing shift range of the engine providing the drive.

When circuits of the above-described nature are produced in large quantity, provision of the circuits in integrated circuit form is to be recommended. All the electronics linking the transducer 13 or the transducers 115 and 180 with the ignition circuit 46 can be combined on one or more integrated circuit units.

Although the invention has been described with reference to particular examples, it will be understood that modifications are possible within the inventive concept.

What is claimed is:
1. Method of timing ignition pulses of an internal combustion engine over a range of timing adjustment by means of a disk coupled to a drive shaft of said engine and bearing a sequence of electrically detectable timing marks thereon, comprising the steps of:
generating an alternating current and a concurrent direct current in a transducer (13, 115) in response to and during nearby passage of said timing marks (12, 111);
producing and transmitting to a count storage device (32, 151a), while said direct current is being generated, a number of pulses dependent on at least one operating condition of said engine;
counting up the half waves of a single polarity of said alternating current produced on the next following passage of said timing marks by said transducer in a counter (17, 131) and comparing in a comparison state (40, 170) the count thereof with the number stored in said count storage device; and
producing an ignition pulse when the count in said counter (17, 131) equals the number stored in said count storage device (33, 151a).

2. Method according to claim 1, which includes the further steps of:
recognizing a null content in said count storage device (32);
transmitting, in response to recognition of such null content, the output of said transducer (13) to trigger means (42) otherwise operable to said comparator stage (40) and thereby producing an ignition pulse, said transmission of said transducer output being made to take place through a pulse trigger stage responsive to said transducer and through a circuit responsive to recognition of said null content (39).

3. Apparatus for timing ignition pulses of an internal combustion engine over a range of timing adjustment, comprising:
an internal combustion engine having an electrical ignition system and having at least one driven shaft coupled to its crankshaft;
rotary disk means coupled to a driven shaft of said engine and provided with a sequence of electrically detectable timing marks (12, 111) thereon, one such sequence being provided for each of a plurality of timing operations produced during one revolution of the disk;
transducer means (13, 115) located adjacent said disk means for generating, during the nearby passage of said sequence of said timing marks, an alternating current and a direct current both flowing only during said nearby passage;
means for counting the number of half waves of one polarity of said alternating current during passage of a sequence of said timing marks;
trigger generating means responsive to the direct current output of said transducer means (13) for a triggered gate signal having a duration dependent on the of continuous flow of said direct current;
means for producing a sequence of pulses controlled in number in accordance with at least one engine operating condition and also in accordance with engine speed, said pulse sequence producing means including a source of a continuous sequence of pulses, first gate period timing means (63, 136–137) responsive to an engine operating condition, and second gate period timing means responsive to said triggered gate signal and to the output of said first gate period timing means, said second gate period timing means being arranged to provide output pulses in response to pulses of said source of pulses during a gate period established by said second gate period timing means;
counting and count storing means (32, 151a) for counting and for storing the count of pulses in each sequence of pulses produced by said second gate period timing means of said pulse sequence producing means, the count counted during one cycle of operation of said transducer means (13) being thereby stored for the duration of the next cycle of operation of said transducer means;

comparison means (40, 170) for comparing the count of half waves of one polarity of said alternating current produced by said transducer means with the count stored in said counting and count storing means (32, 151a) and for producing a pulse at the moment of equality of said compared counts, and means responsive to said comparison means for initiating an ignition pulse in said ignition system for said engine in response to the output of said comparison.

4. Apparatus for timing ignition pulses of an internal combustion engine over a range of timing adjustment, comprising:

an internal combustion engine having an electrical ignition system and having at least one driven shaft coupled to its crankshaft;

rotary disk means coupled to a driven shaft of said engine and provided with at least one sequence of electrically detectable timing marks (12, 111) thereon;

transducer means (13, 115) located adjacent said disk means for generating, during the nearby passage of a sequence of said timing marks, an alternating current and a direct current both flowing only during said nearby passage;

means for counting the number of half waves of one polarity of said alternating current during passage of said timing marks;

trigger generating means responsive to the direct current output of said transducer means (13);

means for producing a sequence of pulse controlled in number in accordance with at least one engine operating condition and also in accordance with engine speed, said pulse sequence producing means including gate period timing means (63, 136-137) responsive to an engine operating condition;

counting and count storing means (32, 151 a for counting and for storing the count of pulses in each sequence of pulses produced by said pulse sequence producing means, the count counted during one cycle of operation of said transducer means (13) being thereby stored for the duration of the next cycle of operation of said transducer means;

limiter means (54) interposed between an output (33) of said counting and count storing means (32) and in input of said pulse sequence producing means for limiting the number of pulses in each sequence of pulses produced by said pulse sequence producing means;

comparison means (40, 170) for comparing the count of half waves of one polarity of said alternating current produced by said transducer means with the count stored in said counting and count storing means (32, 151a) and for producing a pulse at the moment of equality of said compared counts, and means responsive to said comparison means for initiating an ignition pulse in said ignition system for said engine in response to the output of said comparison.

5. Apparatus according to claim 3 in which pulse shaping means (15) and second counting means (17) are provided in sequence between the output of said transducer (13) and an input of said comparison means (40) for supplying to said comparison means the count of half waves of a single polarity of the alternating current output of said transducer in one cycle of its operation.

6. Apparatus as defined in claim 3 in which said first gate period timing means (63) provides a gate the duration of which is dependent upon engine temperature and in which said pulse sequence producing means includes a pulse generator (57) of which the frequency is dependent upon another engine operating parameter.

7. Apparatus as defined in claim 3 in which said transducer (13, 115) is an electromagnetic transducer.

8. Apparatus as defined in claim 3 in which said transducer means (13, 115) is a photoelectric transducer.

9. Apparatus as defined in claim 3 in which the plurality of sequences of electrically detectable marks provided on said disk means (11, 110) respectively correspond to different cylinders of said engine.

10. Apparatus as defined in claim 3 in which an additional electrically detectable mark (112) is provided on said disk means in advance, with reference to the direction of rotation of said disk means, of the aforesaid sequence of electrically detectable marks, and in which also an additional transducer means (180) is provided in the neighborhood of said disk means for generating a pulse in response to the nearby passage of said additional mark.

11. Apparatus as defined in claim 10 in which the storage portion of said counting and count storage means (151a) consists of second counting means (151), storage means (160) and a transfer gate (165) interposed between the counting means and the storage means.

12. Apparatus for timing ignition pulses of an internal combustion engine over a range of timing adjustment, comprising:

an internal combustion engine having an electrical ignition system and having at least one driven shaft coupled to its crankshaft;

rotary disk means coupled to a driven shaft of said engine and provided with at least one sequence of electrically detectable timing marks (12, 111) thereon and also provided with an additional electrically detectable mark (112) in advance, with reference to the direction of rotation of said disk means, of each said sequence of electrically detectable marks;

first transducer means (12, 115) located adjacent said disk means for generating, during the nearby passage of a sequence of said timing marks, an alternative current and a direct current both flowing only during said nearby passage;

second transducer means (180) in the neighborhood of said disk means for generating a pulse in response to the nearby passage of said additional mark (112);

means for counting the number of half waves of one polarity of said alternating current during passage of said timing marks;

trigger generating means responsive to the direct current output of said transducer means (13);

means for producing a sequence of pulses controlled in number in accordance with at least one engine operating condition and also in accordance with engine speed, said pulse sequence producing means including gate period timing means (63, 136-137) responsive to an engine operating condition;
counting and count storing means (32, 151a) for counting and for storing the count of pulses in each sequence of pulses produced by said pulse sequence producing means, the count counted during one cycle of operation of said transducer means (13) being thereby stored for the duration of the next cycle of operation of said transducer means, the storage portion of said counting and count storing means (-a) consisting of second counting means (151), storage means (160) and a transfer gate (165) interposed between the second counting means and the storage means, the counting input (150) of said second counting means (151) being connected to the output (121) of an AND-circuit (119) having a first input (118) connected to said transducer means (115) and a second input (120) connected to the output of a field effect transistor (141), and in which, further, the counting pulses are supplied to the gate electrode (140) of said field effect transistor (141) through low-pass filter means comprising a capacitor (136) and a variable resistor (137), said AND-circuit, field effect transistor and filter means all being part of said pulse sequence producing means;

comparison means (40, 170) for comparing the count of half waves of one polarity of said alternating current produced by said transducer means with the count stored in said counting and count storing means (32, 151a) and for producing a pulse at the moment of equality of said compared counts, and means responsive to said comparison means for initiating an ignition pulse in said ignition system for said engine in response to the output of said comparison.

13. Apparatus for timing ignition pulses of an internal combustion engine over a range of timing adjustment, comprising:

an internal combustion engine having an electrical ignition system and having at least one driven shaft coupled to its crankshaft;

rotary disk means coupled to a driven shaft of said engine and provided with at least one sequence of electrically detectable timing marks (12, 111) thereon and also provided with an additional electrically detectable mark (112) in advance with reference to the direction of rotation of said disk means, of each said sequence of electrically detectable marks;

first transducer means (12, 115) located adjacent said disk means for generating, during the nearby passage of a sequence of said timing marks, an alternating current and a direct current both flowing only during said nearby passage;

second transducer means (180) in the neighborhood of said disk means for generating a pulse in response to the nearby passage of said additional mark (112);

means for counting the number of half waves of one polarity of said alternating current during passage of said timing marks;

trigger generating means responsive to the direct current output of said transducer means (13);

means for producing a sequence of pulse controlled in number in accordance with at least one engine operating condition and also in accordance with engine speed, said pulse sequence producing means including gate period timing means (63, 136–137) responsive to an engine operating condition;

count and count storing means (32, 151a) for counting and for storing the count of pulses in each sequence of pulses produced by said pulse sequence producing means, the count counted during one cycle of operation of said transducer means (130) being thereby stored for the duration of the next cycle of operation of said transducer means, the storage portion of said counting and count storing means (151a) consisting of second counting means (151), storage means (160) and a transfer gate (165) interposed between the second counting means and the storage means, said second transducer means (180) having its output connected to zero reset inputs of said first and second counting means and said storage means;

comparison means (40, 170) for comparing the count of half waves of one polarity of said alternating current produced by said transducer means with the count stored in said counting and count storing means (32, 151a) and for producing a pulse at the moment of equality of said compared counts, and means responsive to said comparison means for initiating an ignition pulse in said ignition system for said engine in response to the output of said comparison.

14. Apparatus for timing ignition pulses of an internal combustion engine over a range of timing adjustment, comprising:

an internal combustion engine having an electrical ignition system and having at least one driven shaft coupled to its crankshaft;

rotary disk means coupled to a driven shaft of said engine and provided with at least one sequence of electrically detectable timing marks (12, 111) thereon and also provided with an additional electrically detectable mark (112) in advance, with reference to the direction of rotation of said disk means, of each said sequence of electrically detectable marks;

first transducer means (12, 115) located adjacent said disk means for generating, during the nearby passage of a sequence of said timing marks, an alternating current and a direct current both flowing only during said nearby passage;

second transducer means (180) in the neighborhood of said disk means for generating a pulse in response to the nearby passage of said additional mark (112);

means for counting the number of half waves of one polarity of said alternating current during passage of said timing marks;

trigger generating means responsive to the direct current output of said transducer means (13);

means for producing a sequence of pulses controlled in number in accordance with at least one engine operating condition and also in accordance with engine speed, said pulse sequence producing means including gate period timing means (63, 136–137) responsive to an engine operating condition;

count and count storing means (32, 151a) for counting and for storing the count of pulses in each sequence of pulses produced by said pulse sequence producing means, the count counted during one cycle of operation of said transducer means (13) being thereby stored for the duration of the next cycle of operation of said transducer means, the storage portion of said counting and count storing means (151a) consisting of second counting means (151), storage means (160) and a transfer gate (165) interposed between the second counting means and the storage means;

comparison means (40, 170) for comparing the count of half waves of one polarity of said alternating current produced by said transducer means with the count stored in said counting and count storing means (32, 151a) and for producing a pulse at the moment of equality of said compared counts;

means responsive to said comparison means for initiating an ignition pulse in said ignition system for said engine in response to the output of said comparison, and null detection means (199) responsive to the output of said second counting means (151) and connected in circuit so that when a null condition in said second counting means is detected, the next output pulse at an output (181) of said second transducer means (180) is transmitted through said means responsive to the output of said comparison-means for producing an ignition pulse for said engine.

15. Apparatus as defined in claim 13 in which flipflop circuit means (126) are provided having a set input (125) responsive to the alternating current pulses from said first transducer means (115) and a reset input (127) connected to be responsive to the output of said second transducer means (180), and in which, further, a dynamic AND-circuit (191) is provided having a static input (190) connected to the noninverting output (128) of said flipflop circuit means (126) and having a dynamic input (192) connected to an output (173) of said comparison means (170).

16. Apparatus as defined in claim 3 for use with a magneto ignition system in which said disk means is part of a magneto generator and in which said electrically detectable marks are provided, accordingly, on a pole wheel of said magneto generator.

17. Apparatus as defined in claim 3 in which the electrical circuits of the various means linking said transducer means and said means for initiating an ignition pulse provided in at least one integrated circuit unit.

* * * * *